US010300743B2

(12) United States Patent
Abe

(10) Patent No.: US 10,300,743 B2
(45) Date of Patent: May 28, 2019

(54) NON-PNEUMATIC TIRE

(71) Applicant: BRIDGESTONE CORPORATION, Tokyo (JP)

(72) Inventor: Akihiko Abe, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 35 days.

(21) Appl. No.: 15/558,410

(22) PCT Filed: Mar. 18, 2016

(86) PCT No.: PCT/JP2016/058821
§ 371 (c)(1),
(2) Date: Sep. 14, 2017

(87) PCT Pub. No.: WO2016/148295
PCT Pub. Date: Sep. 22, 2016

(65) Prior Publication Data
US 2018/0056720 A1 Mar. 1, 2018

(30) Foreign Application Priority Data
Mar. 18, 2015 (JP) .................................. 2015-054247

(51) Int. Cl.
*B60C 7/24* (2006.01)
*B60C 7/00* (2006.01)
(Continued)

(52) U.S. Cl.
CPC .............. *B60C 7/24* (2013.01); *B60B 1/0246* (2013.01); *B60B 1/0261* (2013.01); *B60B 5/02* (2013.01);
(Continued)

(58) Field of Classification Search
CPC .... B60C 7/24; B60C 7/10; B60C 7/14; B60C 7/00; B60C 2007/146; B60B 9/26;
(Continued)

(56) References Cited

U.S. PATENT DOCUMENTS 7,143,797 B2 * 12/2006 Vannan ..................... B60C 7/10
152/7
8,113,253 B2 * 2/2012 Arakawa .................. B60B 9/10
152/11
(Continued)

FOREIGN PATENT DOCUMENTS

CN 103534105 A 1/2014
CN 103874589 A 6/2014
(Continued)

OTHER PUBLICATIONS

Communication dated Apr. 3, 2018 from the European Patent Office in counterpart EP application No. 16765124.9.
(Continued)

*Primary Examiner* — S. Joseph Morano
*Assistant Examiner* — Jean W Charleston
(74) *Attorney, Agent, or Firm* — Sughrue Mion, PLLC

(57) ABSTRACT

A non-pneumatic tire (1) of the present invention includes an attachment body (11) attached to an axle, a ring-shaped body (13) which surrounds the attachment body (11) from the outside in a tire radial direction, and coupling members (15) which displaceably couple the attachment body (11) to the ring-shaped body (13), wherein a plurality of coupling members (15) are arranged in a tire circumferential direction and include elastic coupling plates (21 and 22) whose opposite ends are respectively coupled to the attachment body (11) and the ring-shaped body (13), and a bending rigidity EI1 of the elastic coupling plates (21 and 22) represented by $E1 \times W1 \times t1^3/12$ when the average thickness (Continued)

in the tire circumferential direction is t1 (mm), the average width in a tire width direction H is W1 (mm), and the Young's modulus is E1 (MPa) is smaller than the bending rigidity EI2 of the ring-shaped body (13) represented by $E2 \times W2 \times t2^3/12$ when the average thickness in the tire radial direction is t2 (mm), the average width in the tire width direction H is W2 (mm), and the Young's modulus is E2 (MPa).

3 Claims, 6 Drawing Sheets

(51) Int. Cl.
  *B60C 7/14* (2006.01)
  *B60B 1/02* (2006.01)
  *B60B 5/02* (2006.01)
  *B60B 9/26* (2006.01)
  *B60C 7/10* (2006.01)

(52) U.S. Cl.
  CPC ............ *B60B 9/26* (2013.01); *B60C 7/00* (2013.01); *B60C 7/10* (2013.01); *B60C 7/14* (2013.01); *B60B 1/0269* (2013.01); *B60B 2310/204* (2013.01); *B60B 2900/311* (2013.01); *B60B 2900/325* (2013.01); *B60C 2007/146* (2013.01)

(58) Field of Classification Search
  CPC ....... B60B 5/02; B60B 1/0261; B60B 1/0246; B60B 2900/325; B60B 2900/311; B60B 2310/204; B60B 1/0269
  USPC .......................... 152/5, 7, 11, 12, 17, 69, 80
  See application file for complete search history.

(56) References Cited

U.S. PATENT DOCUMENTS

| | | | |
|---|---|---|---|
| 8,646,497 B2 * | 2/2014 | Cron | ............... B60C 7/18 152/12 |
| 2011/0272254 A1 | 11/2011 | Anderfaas et al. | |
| 2013/0278045 A1 | 10/2013 | Dotson et al. | |
| 2014/0251518 A1 | 9/2014 | Abe et al. | |
| 2015/0246577 A1 * | 9/2015 | Fudemoto | ............... B60B 9/04 152/84 |
| 2015/0258853 A1 | 9/2015 | Fudemoto et al. | |
| 2015/0273945 A1 | 10/2015 | Fudemoto et al. | |
| 2015/0273946 A1 | 10/2015 | Abe et al. | |
| 2017/0120681 A1 | 5/2017 | Toyosawa | |
| 2017/0129285 A1 | 5/2017 | Toyosawa | |

FOREIGN PATENT DOCUMENTS

| | | |
|---|---|---|
| JP | 2010132259 A | 6/2010 |
| JP | 2012-011972 A1 | 1/2012 |
| JP | 2013-071652 A | 4/2013 |
| JP | 2014-008791 A | 1/2014 |
| JP | 2014-008952 A | 1/2014 |
| JP | 2014-91453 A | 5/2014 |
| JP | 2014-125079 A | 7/2014 |
| JP | 2014-125080 A | 7/2014 |
| JP | 2014-125081 A | 7/2014 |
| JP | 2014-125082 A | 7/2014 |
| WO | 03018332 A1 | 3/2003 |
| WO | 2013/152067 A1 | 10/2013 |
| WO | 2015/194087 A1 | 12/2015 |
| WO | 2015/194088 A1 | 12/2015 |

OTHER PUBLICATIONS

International Search Report for PCT/JP2016/058821 filed May 31, 2016.
Communication dated Feb. 22, 2019 from the State Intellectual Property Office in counterpart CN application No. 201680016186.7.

* cited by examiner

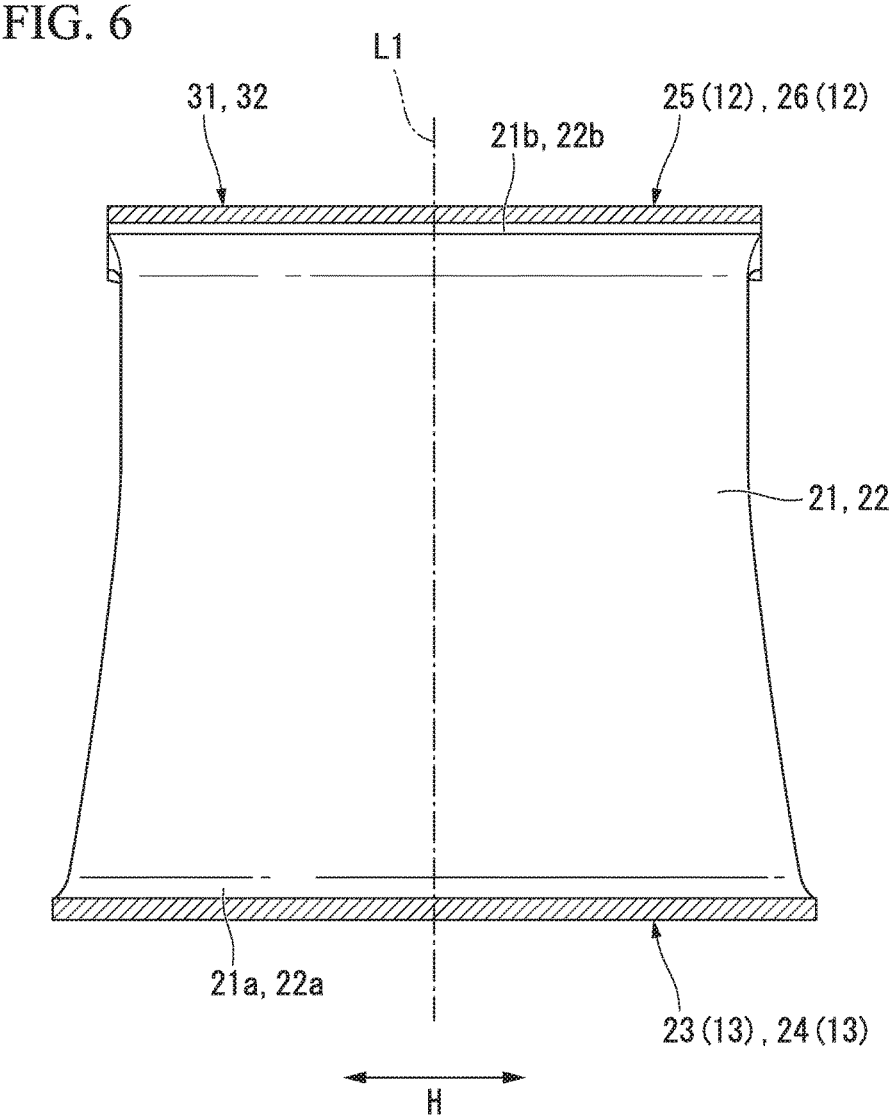

US 10,300,743 B2

NON-PNEUMATIC TIRE

CROSS REFERENCE TO RELATED APPLICATIONS

This application is a National Stage of International Application No. PCT/JP2016/058821 filed Mar. 18, 2016, claiming priority based on Japanese Patent Application No. 2015-054247 filed Mar. 18, 2015, the contents of all of which are incorporated herein by reference in their entirety.

TECHNICAL FIELD

The present invention relates to a non-pneumatic tire in which filling of pressurized air is not necessary, when in use.
Priority is claimed on Japanese Patent Application No. 2015-54247, filed on Mar. 18, 2015, the content of which is incorporated herein by reference.

BACKGROUND ART

Conventionally, for example, a non-pneumatic tire as described in the following Patent Document 1 is known. The non-pneumatic tire includes an attachment body attached to an axle, a ring-shaped body which surrounds the attachment body from the outside in a tire radial direction, and a coupling member which displaceably couples the attachment body to the ring-shaped body. The coupling member includes elastic coupling plates whose opposite ends are respectively coupled to the attachment body and the ring-shaped body. A plurality of elastic coupling plates are arranged in a tire circumferential direction.

CITATION LIST

Patent Document

[Patent Document 1]
Japanese Unexamined Patent Application, First Publication No. 2014-91453

SUMMARY OF INVENTION

Technical Problem

However, in the above-described conventional non-pneumatic tire, a ground contact pressure tends to vary for each position a tire circumferential direction, and variation in ground contact pressure has an influence on abrasivity and steerability.
The present invention is made in consideration of the above-described circumstances, and an object of the present invention is to improve durability and steering stability.

Solution to Problem

A non-pneumatic tire according to the present invention includes an attachment body attached to an axle, a ring-shaped body which surrounds the attachment body from the outside in a tire radial direction, and coupling members which displaceably couple the attachment body to the ring-shaped body, wherein a plurality of coupling members are arranged in a tire circumferential direction and include elastic coupling plates whose opposite ends are respectively coupled to the attachment body and the ring-shaped body, and a bending rigidity EH of the elastic coupling plates represented by $E1 \times W1 \times t1^3/12$ when the average thickness in the tire circumferential direction is t1 (mm), the average width in a tire width direction is W1 (mm), and the Young's modulus is E1 (MPa) is smaller than the bending rigidity EI2 of the ring-shaped body represented by $E2 \times W2 \times t2^3/12$ when the average thickness in the tire radial direction is t2 (mm), the average width in the tire width direction is W2 (mm), and a Young's modulus is E2 (MPa).

Effects of the Invention

According to the preset invention, durability and steering stability of a non-pneumatic tire can be improved.

BRIEF DESCRIPTION OF DRAWINGS

FIG. 6 is a view of a first elastic coupling plate or a second elastic coupling plate according to another embodiment when viewed from a tire circumferential direction.

DESCRIPTION OF EMBODIMENTS

Figure 1:
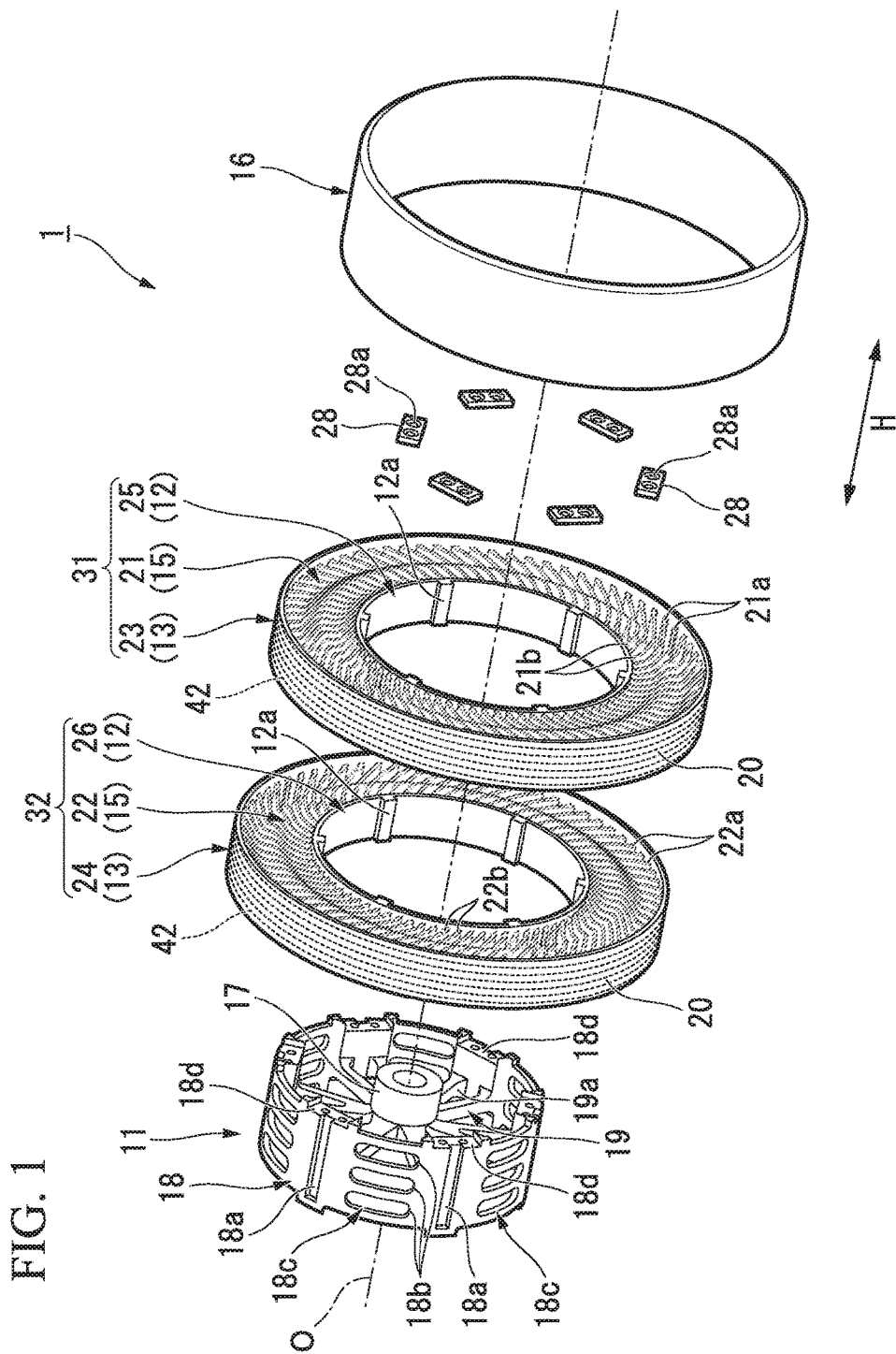
FIG. 1 is a view showing one embodiment of a non-pneumatic tire according to the present embodiment and is a schematic perspective view in which a portion of the non-pneumatic tire is disassembled.
Figure 2:
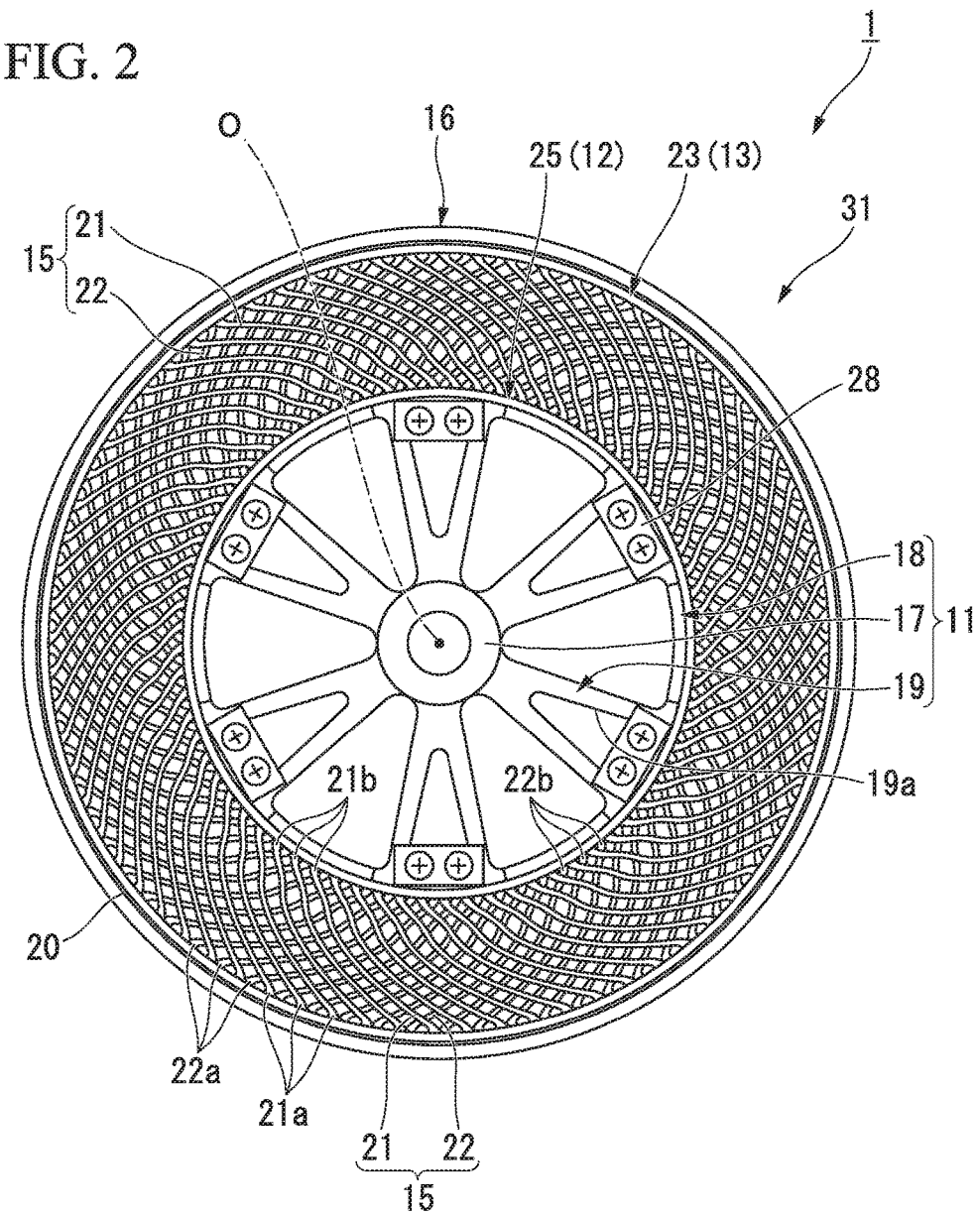
FIG. 2 is a side view of the non-pneumatic tire shown in FIG. 1 when viewed from one side in a tire width direction.

As shown in FIGS. 1 and 2, a non-pneumatic tire 1 of the present embodiment includes an attachment body 11 attached to an axle (not shown), a cylindrical ring-shaped body 13 which surrounds the attachment body 11 from the outside in a tire radial direction, a plurality of coupling members 15 arranged in a tire circumferential direction between the attachment body 11 and the ring-shaped body 13 and configured to couple the attachment body 11 to the ring-shaped body 13 in an elastically relatively displaceable manner, and a cylindrical tread member 16 which wraps externally around the ring-shaped body 13.
Also, the non-pneumatic tire 1 of the present embodiment may be employed in a small-sized vehicle traveling at a low speed such as a handle type electric wheelchair specified in Japanese Industrial Standard T 9208, for example. In addition, the size of the non-pneumatic tire 1 is not particularly limited, but may be in a range of 3.00 to 8 or the like, for example. Also, the non-pneumatic tire 1 may be employed for passenger cars. The size in this case is not particularly limited, but may be 155/65R 13 or the like, for example.
The above-described attachment body 11, the ring-shaped body 13, and the tread member 16 are coaxially arranged on a common axis. Hereinafter, this common axis is referred to as an axis O, a direction along the axis O is referred to as a tire width direction H, a direction perpendicular to the axis O is referred to as a tire radial direction, and a direction of revolving around the axis O is referred to as a tire circumferential direction. Also, a central portion in the tire width direction H of the attachment body 11 and the tread member 16 and a central portion between the two ring-shaped bodies 13 are arranged in a state of being aligned with each other.

A fitting cylinder portion 17 to which a distal end of an axle is fitted, an outer ring portion 18 which surrounds the fitting cylinder portion 17 from the outside in the tire radial direction, and a plurality of ribs 19 which couple fitting cylinder portion 17 to the outer ring portion 18 are provided in the attachment body 11.

The fitting cylinder portion 17, the outer ring portion 18, and the ribs 19 are integrally formed of a metal material such as an aluminum alloy, for example. The lifting cylinder portion 17 and the outer ring portion 18 are formed in a cylindrical shape and are coaxially arranged on the axis O. The plurality of ribs 19 are disposed at regular intervals in the circumferential direction, for example.

A plurality of key groove portions 18a recessed toward the inside in the tire radial direction and configured to extend in the tire width direction H are formed on an outer circumferential surface of the outer ring portion 18 at intervals in the tire circumferential direction. On the outer circumferential surface of the outer ring portion 18, the key groove portions 18a are open only on one side (outside the vehicle body) in the tire width direction H and are closed on the other side (inside the vehicle body) in the tire width direction H.

In the outer ring portion 18, a plurality of lightening holes 18b penetrating through the outer ring portion 18 in the tire radial direction are formed at intervals in the tire width direction H at portions positioned between key groove portions 18a adjacent to each other in the tire circumferential direction. A plurality of hole rows 18c configured by the plurality of lightening holes 18b are formed at intervals in the tire circumferential direction. Similarly, a lightening hole 19a penetrating through the ribs 19 in the tire width direction H is also formed in each of the ribs 19.

A concave portion 18d into which a plate 28 having a through hole 28a is fitted is formed at a position corresponding to the key groove portions 18a at an end edge on one side in the tire width direction H of the outer ring portion 18. The concave portion 18d is recessed toward the other side in the tire width direction H. Also, on a wall surface facing one side in the tire width direction H among wall surfaces defining the concave portion 18d, an internal thread portion communicating with the through hole 28a of the plate 28 that is fitted into the concave portion 18d is formed.

Also, a plurality of through holes 28a are formed in the plate 28 at intervals in the tire circumferential direction.

Similarly, a plurality of internal thread portions are formed on the wall surface of the concave portion 18d at intervals in the tire circumferential direction. In the shown example, a case in which two through holes 28a and two internal thread portions are formed is taken as an example, but the number is not limited to two.

A cylindrical exterior body 12 which is externally fitted to the outer ring portion 18 is provided on the attachment body 11. A ridge portion 12a protruding toward the inside in the tire radial direction and extending over the entire length in the tire width direction H is formed on an inner circumferential surface of the exterior body 12. A plurality of ridge portions 12a are formed on the inner circumferential surface of the exterior body 12 at intervals in the tire circumferential direction and respectively engaged with the key groove portions 18a formed on the attachment body 11.

Thus, the exterior body 12 is fixed to the attachment body 11 by screwing bolts (not shown) into the internal thread portions through the through holes 28a of the plate 28 fitted into the concave portion 18d in a state in which the ridge portion 12a is engaged with the key groove portion 18a.

Also, among wall surfaces defining the key groove portion 18a, a pair of side walls facing each other in the tire circumferential direction are formed to be perpendicular to a bottom wall surface. Similarly, among outer surfaces of the ridge portion 12a, a pair of side wall surfaces erected from the inner circumferential surface of the exterior body 12 and a top wall surface facing the inside in the tire radial direction are formed to be perpendicular to each other. Therefore, the sizes in the tire circumferential direction of the ridge portion 12a and the key groove portion 18a are equal to each other.

With the configuration as above, the ridge portion 12a is precisely engaged with the key groove portion 18a with little rattling.

The coupling member 15 couples an outer circumferential surface side of the attachment body 11 to an inner circumferential surface side of the ring-shaped bodies 13 in an elastically relatively displaceable manner. In the shown example, the coupling member 15 includes a first elastic coupling plate 21 and a second elastic coupling plate 22 which couple an outer circumferential surface of the exterior body 12 of the attachment body 11 to the inner circumferential surface of the ring-shaped bodies 13. Both of the first elastic coupling plate 21 and the second elastic coupling plate 22 are formed of an elastically deformable plate.

A plurality of First elastic coupling plates 21 are disposed in the tire circumferential direction at positions on one side in the tire width direction H. A plurality of second elastic coupling plates 22 are disposed in the tire circumferential direction at positions on the other side in the tire width direction H. That is, the plurality of first elastic coupling plates 21 and second elastic coupling plates 22 are disposed at intervals from each other in the tire width direction H and are disposed in the tire circumferential direction at respective positions. For example, 60 of the first elastic coupling plates 21 and the second elastic coupling plates 22 may be respectively provided in the tire circumferential direction.

A plurality of coupling members 15 are respectively disposed at positions rotationally symmetrical with respect to the axis O between the exterior body 12 and the ring-shaped bodies 13. Also, all the coupling members 15 have the same shape and the same size, and the width of the coupling members 15 in the tire width direction H is smaller than the width of the ring-shaped body 13 in the tire width direction H.

Therefore adjacent first elastic coupling plates 21 in the tire circumferential direction are not in contact with each other. Similarly, adjacent second elastic coupling plates 22 in the tire circumferential direction are not in contact with each other. Also, adjacent first elastic coupling plates 21 and second elastic coupling plates 22 in the tire width direction H are not in contact with each other. In addition, the first elastic coupling plates 21 and the second elastic coupling plates 22 have the same width in the tire width direction H and thickness.

Figure 3:
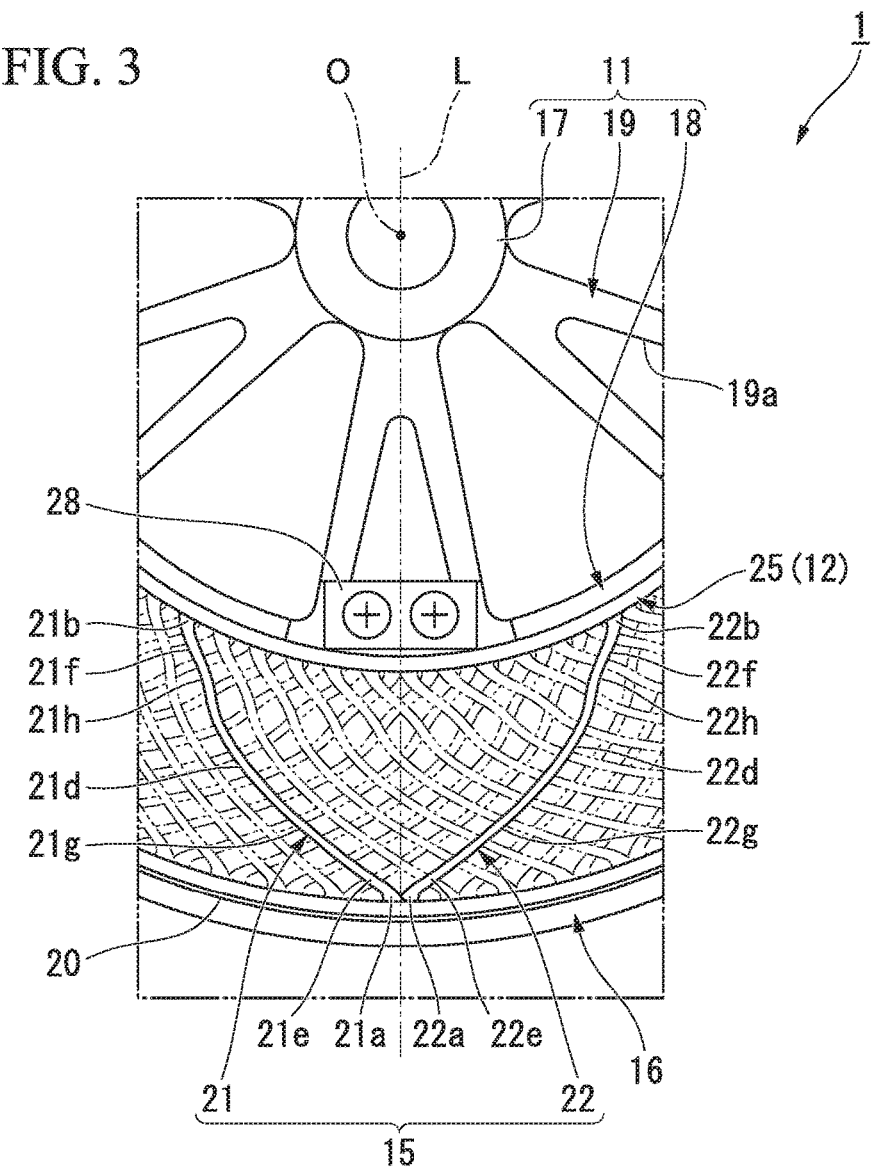
FIG. 3 is an enlarged view showing a main portion of FIG. 2.
Figure 4:
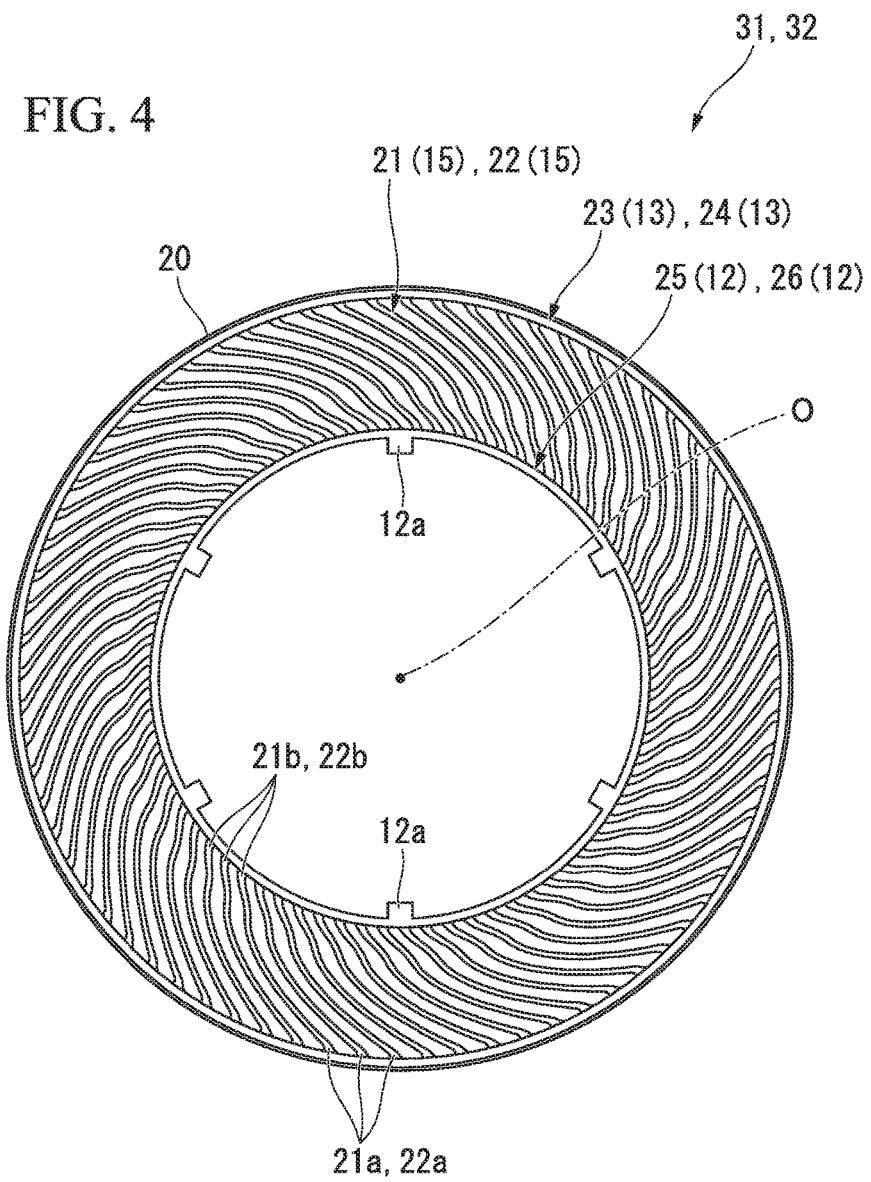
FIG. 4 is a tire side view of a first part case body in the non-pneumatic tire shown in FIG. 1 when viewed from one side in the tire width direction or a tire side view of a second part case body when viewed from the other side in the tire width direction.

As shown in FIGS. 3 and 4, in the first elastic coupling plate 21, one end portion (an outer end portion 21a) coupled to the ring-shaped body 13 is positioned on one side in the tire circumferential direction of the other end portion (an inner end portion 21b) coupled to the exterior body 12. On the other hand, in the second elastic coupling plate 22, one end portion (an outer end portion 22a) coupled to the ring-shaped body 13 is positioned on the other side in the tire circumferential direction of the other end portion (an inner end portion 22b) coupled to the exterior body 12.

Therefore, the respective outer end portions 21a and 22a of the first elastic coupling plate 21 and the second elastic coupling plate 22 which constitute one coupling member 15 are coupled to the same position on the inner circumferential surface of the ring-shaped bodies 13 in the tire circumferential direction in a state in which their positions in the tire width direction H are different from each other.

As shown in FIG. 3, a plurality of curved portions 21d to 21f and 22d to 22f which are curved in the tire circumferential direction are formed in the first elastic coupling plate 21 and the second elastic coupling plate 22 at intermediate portions positioned between the outer end portions 21a and 22a and the inner end portions 21b and 22b.

The plurality of curved portions 21d to 21f, and 22d to 22f are formed along an extending direction in which the first elastic coupling plate 21 and the second elastic coupling plate 22 extend in a tire side view when the non-pneumatic tire 1 is viewed from the tire width direction H. In the shown example, the plurality of curved portions 21d to 21f in the first elastic coupling plate 21 and the plurality of curved portions 22d to 22f in the second elastic coupling plate 22 are adjacent to each other in the extending direction while having curvature directions opposite to each other.

The plurality of curved portions 21d to 21f formed in the first elastic coupling plate 21 include a first curved portion 21d curved to protrude toward the other side in the tire circumferential direction, a second curved portion 21e positioned between the first curved portion 21d and the outer end portion 21a and curved to protrude toward one side in the tire circumferential direction, and a third curved portion 21f positioned between the first curved portion 21d and the inner end portion 21b and curved to protrude toward one side in the tire circumferential direction. The second curved portion 21e is continuous with the outer end portion 21a.

The plurality of curved portions 22d to 22f formed in the second elastic coupling plate 22 include a first curved portion 22d curved to protrude toward one side in the tire circumferential direction, a second curved portion 22e positioned between the first curved portion 22d and the outer end portion 22a and curved to protrude toward the other side in the tire circumferential direction, and a third curved portion 22f positioned between the first curved portion 22d and the inner end portion 22h and curved to protrude toward the other side in the tire circumferential direction. The second curved portion 22e is continuous with the outer end portion 22a.

In the shown example, the radii of curvature of the first curved portions 21d and 22d in a tire side view are larger than those of the second curved portions 21e and 22e and the third curved portions 21f and 22f, and the first curved portions 21d and 22d are disposed at central portions in the extending directions of the first elastic coupling plate 21 and the second elastic coupling plate 22.

The lengths of the first elastic coupling plate 21 and the second elastic coupling plate 22 are equal to each other. The inner end portions 21b and 22b of the first elastic coupling plate 21 and the second elastic coupling plate 22 are coupled, in a tire side view, to respective positions at the same distance on one side and the other side in the tire circumferential direction about the axis O on the outer circumferential surface of the exterior body 12 from a position facing the outer end portions 21a and 22a in the tire radial direction.

Also, the first curved portions 21d and 22d, the second curved portions 21e and 22e, and the third curved portions 21f and 22f in each of the first elastic coupling plate 21 and the second elastic coupling plate 22 have respective protruding directions which are opposite to each other in the tire circumferential direction while they are the same in size.

With the configuration as above, as shown in FIG. 3, a shape of each coupling member 15 in a tire side view is symmetrical with respect to a virtual line L extending in the tire radial direction and passing through the outer end portions 21a and 22a of each of the first elastic coupling plate 21 and the second elastic coupling plate 22.

In addition, as shown in FIG. 3, inflection portions 21g, 21h, 22g and 22h are formed in the first elastic coupling plate 21 and the second elastic coupling plate 22 at portions positioned between each of the curved portions 21d to 21f, and 22d to 22f adjacent to each other in the extending direction of the elastic coupling plates 21 and 22.

The inflection portions 21g, 21h, 22g and 22h are formed to have a smaller area of transverse section surface (a transverse section area) perpendicular to the extending direction than that of other portions in the first elastic coupling plate 21 and the second elastic coupling plate 22, and are positioned at boundary regions of each of the curved portions 21d to 21f and 22d to 22f adjacent to each other in the extending direction in each of the first elastic coupling plate 21 and the second elastic coupling plate 22.

In the shown example, each transverse section area in the extending direction of the first elastic coupling plate 21 and the second elastic coupling plate 22 is formed to gradually decrease in size in a direction toward the inflection portions 21g, 21h, 22g and 22h.

The above-described exterior body 12, the ring-shaped bodies 13, and the plurality of coupling members 15 are integrally formed of a synthetic resin material, for example. The synthetic resin material may be, for example, a single resin material, a mixture containing two or more kinds of resin material, or a mixture containing one or more kinds of resin material and one or more kinds of elastomer, and furthermore, may include additives such as anti-aging agents, plasticizers, fillers, and pigments, for example.

Incidentally, as shown in FIG. 1, the exterior body 12 is divided into a first exterior body 25 positioned on one side in the tire width direction H and a second exterior body 26 positioned on the other side in the tire width direction H. Similarly, the ring-shaped body 13 is divided into a first ring-shaped body 23 positioned on one side in the tire width direction H and a second ring-shaped body 24 positioned on the other side in the tire width direction H.

In the shown example, each of the exterior body 12 and the ring-shaped body 13 is divided at the central portion in the tire width direction H.

Also, the first exterior body 25 and the first ring-shaped body 23 are integrally formed with the first elastic coupling plate 21, for example, by injection molding. The second exterior body 26 and the second ring-shaped body 24 are integrally formed with the second elastic coupling plate 22, for example, by injection molding. That is, the exterior body 12 to which the coupling member 15 is coupled in the attachment body 11, the ring-shaped body 13, and the coupling member 15 are integrally formed of a synthetic resin material.

Hereinafter, a unit in which the first exterior body 25, the first ring-shaped body 23, and the first elastic coupling plate 21 are integrally formed is referred to as a first part case body 31, and a unit in which the second exterior body 26, the second ring-shaped body 24, and the second elastic coupling plate 22 are integrally formed is referred to as a second part case body 32.

Also, when the first part case body 31 is taken as an example, injection molding methods available to be used include a general method of molding the entire first part case body 31 at once, insert molding in which the remaining portions other than insert parts are injection molded with some portions among the first exterior body 25, the first ring-shaped body 23, and the first elastic coupling plate 21 being provided as the insert parts, a so-called two-color molding, or the like. In addition, when the entirety of the first part case body 31 is injection-molded at once, the plurality of ridge portions 12a formed on the exterior body 12 may be a gate portion.

These points apply to the second part case body 32.

Also, at the time of injection-molding, when the first part case body 3l is taken as an example, the first exterior body 25, the first ring-shaped body 23, and the first elastic coupling plate 21 may be formed of different materials, and may be formed of the same material. As such a material, metal materials or resin materials are examples, however, resin materials, particularly thermoplastic resins, are preferable from the perspective of reducing weight.

These points apply to the second part case body 32.

The first ring-shaped body 23 and the second ring-shaped body 24 are coupled to each other, by welding, fusing, or bonding end edges thereof facing each other in the tire width direction, for example. Also, in the case of welding, hot plate welding may be employed, for example. Similarly, end edges of the first exterior body 25 and the second exterior body 26 facing each other in the tire width direction H are in contact with each other.

As shown in FIG. 1, the first part case body 31 and the second part case body 32 have the same shape and the same size. Also, when the first part case body 31 and the second part case body 32 are integrally coupled as described above, end edges of the first ring-shaped body 23 and the second ring-shaped body 24 abut each other in the tire width direction H and are coupled in a state in which directions of the first part case body 31 and the second part case body 32 are opposite to each other in the tire width direction H while the first part case body 31 and the second part case body 32 are positioned in the fire circumferential direction so that each of the coupling members 15 is line-symmetrical in the tire side view as described above.

Thereafter, the non-pneumatic tire 1 can be obtained by providing the tread member 16 to the first part case body 31 and the second part case body 32 which are integrally combined.

Figure 5:
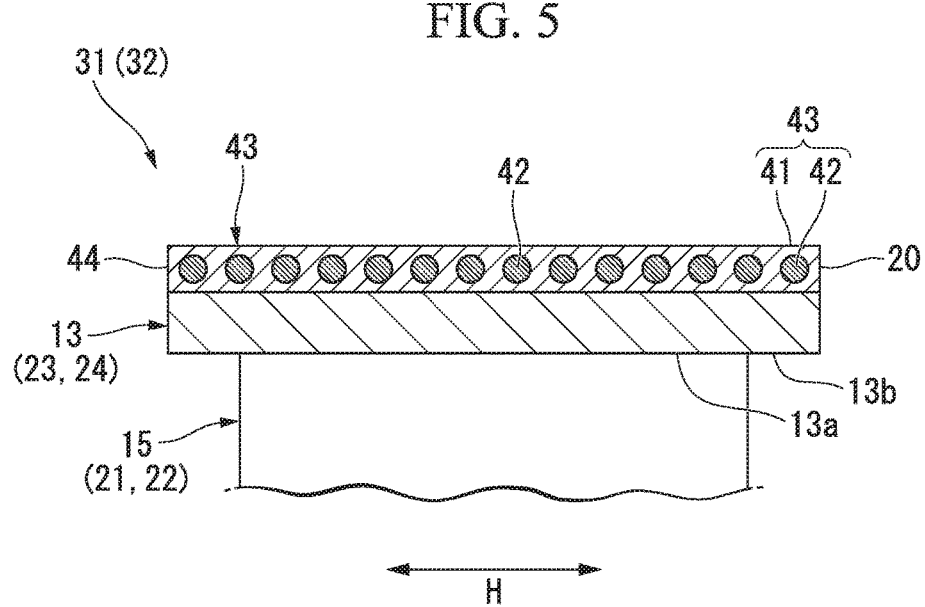
FIG. 5 is a cross-sectional view taken along the tire width direction of a ring-shaped body of the first part case body or the second part case body shown in FIG. 4.

Here, as shown in FIG. 5, a spiral reinforcing layer 20 is bonded to an outer circumferential surface of the ring-shaped body 13. The spiral reinforcing layer 20 is formed by spirally winding an element wire body 43 in which one cord 42 is embedded in a covering body 41 formed of, for example, a resin material or the like, on the outer circumferential surface of the ring-shaped body 13. Since the element wire bodies 43 are spirally round on the outer circumferential surface of the ring-shaped body 13, the element wire bodies 43 are adjacent to e other in the tire width direction H on the outer circumferential surface. Since the covering bodies 41 at a portion in which the element wire bodies 43 are adjacent to each other in the tire width direction H are integrally fixed in the tire width direction H, a base layer 44 made of the covering bodies 41 is formed on the outer circumferential surface of the ring-shaped body 13. The spiral reinforcing layer 20 is formed by one spirally extending cord 42 embedded in the base layer 44. As the cord 42, a steel cord or the like is an example.

The spiral reinforcing layer 20 is bonded at least to an outer circumferential surface of an avoidance portion 13b in which a coupling portion 13a with the coupling members 15 (the first elastic coupling plate 21 and the second elastic coupling plate 22) is avoided in the ring-shaped body 13, and, in the present embodiment, is bonded over the entire region of the outer circumferential surface of the ring-shaped body 13. In the shown example, the avoidance portion 13h of the ring-shaped body 13 is opposite end portions in the tire width direction H of the first ring-shaped body 23 or the second ring-shaped body 24 which is the ring-shaped body 13 of the first part case body 31 or the second part case body 32, and the coupling portion 13a of the ring-shaped body 13 is a central portion in the tire width direction H of the first ring-shaped body 23 or the second ring-shaped body 24. That is, the avoidance portion 13b of the ring-shaped body 13 is a portion other than the coupling portion 13a with the coupling members 15 in a cross-sectional view in the tire width direction H of the ring-shaped body 13.

In the present embodiment, the spiral reinforcing layer 20 is provided on the first ring-shaped body 23 or the second ring-shaped body 24. The size of the element wire body 43 width direction H is smaller than a size of the first ring-shaped body 23 or the second ring-shaped body 24 in the tire width direction H. The spiral reinforcing layer 20 has a single layer structure in which one layer s provided on the outer circumferential surface of the ring-shaped body 13.

As an example of a method of bonding the spiral reinforcing layer 20 to the outer circumferential surface of the ring-shaped body 13, the following method is an example. That is, first, each of the covering body 41 of the element wire body 43 and the outer circumferential surface of the ring-shaped body 13 are heated and melted, and an end portion of the element wire body 43 is welded to the outer circumferential surface of the ring-shaped body 13. Thereafter, while continuing the heating, while rotating the first part case body 31 (or the second part case body 32) around the axis O, the element wire body 43 is moved in the tire width direction H with respect to the first part case body 31 (or the second part case body 32) and wound on the outer circumferential surface of the ring-shaped body 13. Thereby, the element wire body 43 is spirally wound on the ring-shaped body 13 and the spiral reinforcing layer 20 is formed. In such a spiral reinforcing layer 20, positions of opposite end portions in a length direction of the element wire body 43 are shifted in the tire width direction H and these opposite end portions are not joined to each other. Further, the inciting point of the covering body 41 and a melting point of the ring-shaped body 13 may be equal to each other, and in this case, the element wire body 43 can be reliably welded to the ring-shaped body 13.

As shown in FIGS. 1 and 2, the tread member 16 is formed in a cylindrical shape and integrally covers the outer circumferential surface side of the ring-shaped body 13 over the entire region. An inner circumferential surface of the tread member 16 is in close contact with the circumferential surface of the ring-shaped body 13 over the entire region via the spiral reinforcing layer 20. The tread member 16 is formed of a natural rubber and/or a vulcanized rubber in which the rubber composition is vulcanized, a thermoplastic material, or the like, for example.

As the thermoplastic material, a thermoplastic elastomer, a thermoplastic resin, or the like is an example. As thermoplastic elastomers, amide-based thermoplastic elastomers (TPA), ester-based thermoplastic elastomers (TPC), olefin-based thermoplastic elastomers (TPO), styrene-based thermoplastic elastomers (TPS), urethane-based thermoplastic elastomers (TPU), a thermoplastic rubber cross-linker (TPV), other thermoplastic elastomers (TPZ), or the like, specified in Japanese Industrial Standard JIS K6418, are examples.

As the thermoplastic resin, urethane resins, olefin resins, vinyl chloride resins, polyamide resins, or the like are examples. Also, it is preferable to form the tread member 16 with a vulcanized rubber from the perspective of wear resistance.

In the present embodiment, a bending rigidity EI1 of the elastic coupling plates 21 and 22 is smaller than a bending rigidity EI2 of the ring-shaped body 13. Each of the bending rigidities of the first elastic coupling plate 21 and the second elastic coupling plate 22 are equal to each other, and both the bending rigidities of the elastic coupling plates 21 and 22 are smaller than the bending rigidity of the ring-shaped body 13. The bending rigidity EI2 of the ring-shaped body 13 is twice or more and 200 times or less, preferably twice or more and 100 times or less, and more preferably twice or more and 10 times or less the bending rigidity EI1 of the elastic coupling plates 21 and 22.

Here, the bending rigidity EI1 of the elastic coupling plates 21 and 22 is represented by $E1 \times W1 \times t1^3/12$ when an average thickness in the tire circumferential direction is t1 (mm), an average width in the tire width direction H is W1 (mm), and a Young's modulus is E1 (MPa) in the elastic coupling plates 21 and 22. The average thickness t1 of the elastic coupling plates 21 and 22 can be obtained as the average value of the thicknesses of the elastic coupling plates 21 and 22 at each position in the extending direction of the elastic coupling plates 21 and 22 described above. The average width W1 of the elastic coupling plates 21 and 22 can be obtained as the average value of the widths of the elastic coupling plates 21 and 22 at each position in the extending direction of the elastic coupling plates 21 and 22 described above.

In addition, the bending rigidity of the ring-shaped body 13 is represented by $E2 \times W2 \times t2^3/12$ when an average thickness in the tire radial direction is t2 (mm), an average width in the tire width direction H is W2 (mm), and a Young's modulus is E2 (MPa) in the ring-shaped body 13. The average thickness t2 of the ring-shaped body 13 can be obtained as the average value of the thicknesses of the ring-shaped body 13 at each position in the tire circumferential direction. The average width W2 of the ring-shaped body 13 can be obtained as the average value of the widths of the ring-shaped body 13 at each position in the tire circumferential direction. In the shown example, both the thickness of the ring-shaped body 13 and the width of the ring-shaped body 13 are uniform over the entire circumference in the tire circumferential direction.

Here, as shown in FIGS. 3 and 4, the average thickness t1 in the tire circumferential direction of the elastic coupling plates 21 and 22 is smaller than the average thickness t2 in the tire radial direction of the ring-shaped body 13. Further, the sum of the lengths of the plurality of elastic coupling plates 21 and 22 when viewed from the tire width direction 11 is longer than a circumferential length of the ring-shaped body 13. Since the lengths of the plurality of elastic coupling plates 21 and 22 when viewed from the tire width direction H are the same for all of the elastic coupling plates 21 and 22, the sum of the lengths of the plurality of elastic coupling plates 21 and 22 when viewed from the tire width direction H can be obtained by multiplying the length of each of the elastic coupling plates 21 and 22 when viewed from the tire width direction by the total number of the elastic coupling plates 21 and 22.

The bending elastic modulus of the ring-shaped body 13 may be greater than a bending elastic modulus of the elastic coupling plates 21 and 22 and may be 1.1 times the bending elastic modulus of the elastic coupling plates 21 and 22 or more. The bending elastic modulus of the elastic coupling plates 21 and 22 is preferably 20 MPa or more and 5000 MPa or less, and more preferably 100 MPa or more and 2000 MPa or less. Each bending elastic modulus of the ring-shaped body 13 and the elastic coupling plates 21 and 22 is expressed by a proportional constant between stress and distortion at the time of 0.05 to 0.25% distortion obtained by performing a bending test according to Japanese Industrial Standard RS K7171.

As described above, according to the non-pneumatic tire 1 according to the present embodiment, since the bending rigidity EI1 of the elastic coupling plates 21 and 22 is smaller than the bending rigidity EI2 of the ring-shaped body 13, it is possible to alleviate the stress occurring at a portion beneath the elastic coupling plates 21 and 22 in a ground contact surface of the non-pneumatic tire 1 by providing the elastic coupling plates 21 and 22 with flexibility. Thereby, it is possible to suppress occurrence of variation in ground contact pressure in the ground contact surface, and thus the occurrence of uneven wear on the outer circumferential surface of the non-pneumatic tire 1 and hindrance of the steering stability can be suppressed.

Further, since the bending rigidity EI2 of the ring-shaped body 13 is greater than the bending rigidity EI1 of the elastic coupling plates 21 and 22, it is possible for excessive deformation of the ring-shaped body 13 to be suppressed during traveling and it is also possible to prevent durability of the non-pneumatic tire from degrading.

In addition, since the bending rigidity EI2 of the ring-shaped body 13 is twice or more and 200 times or less the bending rigidity EI1 of the elastic coupling plates 21 and 22, steering stability can be secured. That is, when the bending rigidity EI2 of the ring-shaped body 13 is greater than 200 times the bending rigidity EI1 of the elastic coupling plates 21 and 22, the ring-shaped body 13 is not easily deformed, the area of the ground contact surface decreases, and thus uneven wear may occur on the outer circumferential surface of the non-pneumatic tire 1 and steering stability may be hindered.

In addition, the average thickness t1 in the tire circumferential direction of the elastic coupling plates 21 and 22 is smaller than the average thickness t2 in the tire radial direction of the ring-shaped body 13, and the sum of lengths of the plurality of elastic coupling plates 21 and 22 when viewed from the tire width direction H is longer than the circumferential length of the ring-shaped body 13. Therefore, in regards to the respective average thicknesses t1 and t2 of the elastic coupling plates 21 and 22 and the ring-shaped body 13 which greatly influence the bending rigidities EI1 and EI2, by securing a difference between the elastic coupling plates 21 and 22 and the ring-shaped body 13, the bending rigidity EI1 of the elastic coupling plates 21 and 22 can be reliably made smaller than the bending rigidity E12 of the ring-shaped body 13. On the other hand, in regards to the length of the elastic coupling plates 21 and 22 and the circumferential length of the ring-shaped body 13 which have less influence over the bending rigidities EI1 and EI2, by making the sum of lengths of the plurality of elastic coupling plates 21 and 22 when viewed from the tire width direction H longer than the circumferential length of the ring-shaped body 13, it is possible to prevent the ring-shaped body 13 from becoming excessively heavy and reduce the entire mass of the non-pneumatic tire 1.

The technical scope of the present invention is not limited to the above embodiments, and various modifications can be added to the scope of the present invention without departing from the spirit of the present invention.

For example, as the spiral reinforcing layer 20, it is possible to employ a configuration in which the spiral reinforcing layer 20 is formed to be a two-layer structure (multilayer structure) over the entire region, a configuration in which the spiral reinforcing layer 20 is partially formed to be a two-layer structure, a configuration in which an outer diameter of the cord 42 varies depending on a position in the width direction H while the spiral reinforcing layer 20 is one layer, or the like.

In the embodiment described above, the spiral reinforcing layer 20 is bonded over the entire region of the outer circumferential surface of the ring-shaped body 13, but the present invention is not limited thereto. For example, the spiral reinforcing layer 20 may be provided only on a limited portion of the outer circumferential surface of the ring-shaped body 13.

In addition, as the element wire body 43, it is also possible to employ a configuration in which a plurality of cords 42 arranged in parallel in the tire width direction H are embedded in the covering body 41. In this case, in the spiral reinforcing layer 20, the plurality of cords 42 are spirally wound in parallel on the outer circumferential surface of the ring-shaped body 13.

Further the spiral reinforcing layer 20 may be omitted.

In addition, the first elastic coupling plate 21 and the second elastic coupling plate 22 may have a configuration not having a plurality of inflection portions. For example, it is possible to have a shape of which a width gradually decreases from the outer end portion 21a and the inner end portion 21b toward the central portion in the extending direction of the coupling member 15.

Also, although the configuration of the coupling member 15 being provided with one of each of the first elastic coupling plate 21 and the second elastic coupling plate 22 has been described in the present embodiment, instead of this, a plurality of first elastic coupling plates 21 and second elastic coupling plates 22 having different positions from each other in the tire width direction H may be provided for one of coupling member 15. Also, a plurality of coupling members 15 may be provided between the exterior body 12 and the ring-shaped body 13 in the tire width direction H.

Also, instead of the above-described embodiment, for example, the inner end portions 21b and 22b of the first elastic coupling plate 21 and the second elastic coupling plate 22 may be coupled to each of opposite positions with the axis O therebetween in the tire radial direction on the outer circumferential surface of the exterior body 12 or may be coupled to positions, on the outer circumferential surface of the exterior body 12, facing the outer end portions 21a and 22a of the first elastic coupling plate 21 and the second elastic coupling plate 22 in the tire radial direction, or the like. In addition, stead of the above-described embodiment, the outer end portions 21a and 22a of the first elastic coupling plate 21 and the second elastic coupling plate 22 may be coupled to the inner circumferential surface of the ring-shaped body 13 while positions thereof in the tire circumferential direction are made to be different from each other.

Further, in the present embodiment, a gap in the tire width direction H may or may not be provided between the first exterior body 25 and the second exterior body 26. Also, the exterior body 12 and the ring-shaped body 13 may or may not be divided into three or more in the tire width direction H.

Furthermore, the first exterior body 25 (the first part case body 31) and the second exterior body 26 (the second part case body 32) may be rally formed as shown in FIG. 6. In this case, the first elastic coupling plate 21 and the second elastic coupling plate 22 are integrally provided and are line-symmetrical with respect to a virtual line L1 passing through each of outer end portions 21a and 22a of the first elastic coupling plate 21 and the second elastic coupling plate 22 in a tire front view when viewed from the tire circumferential direction.

In addition, in the above embodiment, the exterior body 12, the ring-shaped body 13, and the coupling member 15 are integrally formed by injection molding, for example, but the present invention is not limited to injection molding, and they may be integrally formed by casting or the like, for example. Also, the exterior body 12, the ring-shaped body 13, and the coupling member 15 may be individually formed and coupled to each other.

In addition, the above-described embodiment is configured to indirectly couple the coupling member 15 to the outer ring portion 18 of the attachment body 11 with the exterior body 12 interposed therebetween, but the present invention is not limited thereto, and it may be configured to directly couple the coupling member 15 to the outer ring portion 18 of the attachment body 11, for example.

In addition, the components in the above-described embodiments can be appropriately replaced with well-known components without departing from the spirit and scope of the present invention, and furthermore, the above-described modified examples may be appropriately combined.

Next, a verification test on the operation and effects described above was conducted.

In the present verification test, the operation and effects when the bending rigidity EI2 of the ring-shaped body 13 was twice or more and 200 times or less the bending rigidity EI1 of the elastic coupling plates 21 and 22 were verified.

In the present verification test, a total of 10 types of non-pneumatic tire including non-pneumatic tires of Comparative examples 1 to 5 and non-pneumatic tires of Examples 1 to 5 were prepared. The size of these non-pneumatic tires was uniformized as 155/65R 13. In these non-pneumatic tires, the bending rigidity EI1 of the elastic coupling plates 21 and 22 and the bending rigidity EI2 of the ring-shaped body 13 were made to be different, and the bending elastic modulus of the elastic coupling plates 21 and 22 and the bending elastic modulus of the ring-shaped body 13 were made to be different. For each of the non-pneumatic tires, as the ratio of bending rigidity, the ratio of the bending rigidity EI2 of the ring-shaped body 13 with respect to the bending rigidity EI1 of the elastic coupling plates 21 and 22 (bending rigidity EI2 of the ring-shaped body 13/bending rigidity EI1 of the elastic coupling plates 21 and 22) was calculated. As the ratio of the bending elastic modulus, the ratio of the bending elastic modulus of the ring-shaped body 13 with respect to the bending elastic modulus of the elastic coupling plates 21 and 22 (bending elastic modulus of the ring-shaped body 13/bending elastic modulus of the elastic coupling plates 21 and 22) was calculated.

For each of the non-pneumatic tires of Comparative examples 1 to 5 and Examples 1 to 5, the ratio of bending rigidity, the ratio of bending elastic modulus, and the bending elastic modulus (MPa) of the elastic coupling plates 21 and 22 described above are summarized in Table 1 below. In Table 1, steerability and durability from test results to be described later are also shown.

TABLE 1

|  | Comparative Example 1 | Comparative Example 2 | Comparative Example 3 | Comparative Example 4 | Comparative Example 5 |
|---|---|---|---|---|---|
| Ratio of bending rigidity | 0.9 | 1.2 | 1.5 | 1.1 | 300 |
| Ratio of bending elastic modulus | 1 | 1 | 1.05 | 1 | 3 |
| Bending elastic modulus (MPa) of elastic coupling plate | 15 | 10 | 15 | 6000 | 15 |
| Steerability | 60 | 100 | 105 | 70 | 60 |
| Durability | 70 | 100 | 105 | 110 | 105 |

|  | Example 1 | Example 2 | Example 3 | Example 4 | Example 5 |
|---|---|---|---|---|---|
| Ratio of bending rigidity | 2 | 4.6 | 7.5 | 10 | 200 |
| Ratio of bending elastic modulus | 1.1 | 1.25 | 1.22 | 2.2 | 8 |
| Bending elastic modulus (MPa) of elastic coupling plate | 2000 | 500 | 500 | 100 | 20 |
| Steerability | 150 | 180 | 160 | 150 | 120 |
| Durability | 200 | 260 | 300 | 220 | 150 |

For each of the non-pneumatic tires of Comparative examples 1 to 5 and Examples 1 to 5 as above, steerability and durability tests were conducted under the same conditions. The steerability was sensorily evaluated according to a drivers' feeling when a four-wheeled vehicle to which each non-pneumatic tire was mounted ran a test course. The durability was evaluated according to a distance until each non-pneumatic tire run by a drum testing machine broke.

Then, with the test result of the non-pneumatic tire of Comparative example 2 taken as a reference value of 100, the test results of each non-pneumatic tire were evaluated as an index. The evaluation is shown in the lower two rows of Table 1. The higher the numerical values indicated, the better the steerability and the durability.

From these results, it was confirmed that the steerability and the durability of Examples 1 to 5 are significantly improved as compared with Comparative example 2.

INDUSTRIAL APPLICABILITY

According to the present invention, durability and steering stability of a non-pneumatic tire can be improved.

REFERENCE SIGNS LIST

1 Non-pneumatic tire
11 Attachment body
13 Ring-shaped body
15 Coupling member
19 Rib
21, 22 Elastic coupling plate
H Tire width direction

What is claimed is:

1. A non-pneumatic tire comprising:
an attachment body attached to an axle;
a ring-shaped body which surrounds the attachment body from the outside in a tire radial direction; and
coupling members which displaceably couple the attachment body to the ring-shaped body, wherein
a plurality of coupling members are arranged in a tire circumferential direction and include elastic coupling plates whose opposite ends are respectively coupled to the attachment body and the ring-shaped body, and
a bending rigidity $EI1$ of the elastic coupling plates represented by $E1 \times W1 \times t1^3/12$ when an average thickness in the tire circumferential direction is $t1$ (mm), an average width in a tire width direction is $W1$ (mm), and a Young's modulus is $E1$ (MPa) is smaller than a bending rigidity $EI2$ of the ring-shaped body represented by $E2 \times W2 \times t2^3/12$ when an average thickness in the tire radial direction is $t2$ (mm), an average width in the tire width direction is $W2$ (mm), and a Young's modulus is $E2$ (MPa).

2. The non-pneumatic tire according to claim 1, wherein the bending rigidity $EI2$ of the ring-shaped body is twice or more and 200 times or less the bending rigidity $EI1$ of the elastic coupling plates.

3. The non-pneumatic tire according to claim 1, wherein:
the average thickness $t1$ in the tire circumferential direction of the elastic coupling plates is smaller than the average thickness $t2$ in the tire radial direction of the ring-shaped body, and
a sum of lengths of the plurality of elastic coupling plates when viewed from the tire width direction is longer than a circumferential length of the ring-shaped body.

* * * * *